United States Patent
Ravindran et al.

(10) Patent No.: US 10,373,630 B2
(45) Date of Patent: Aug. 6, 2019

(54) SYSTEMS AND METHODS FOR ENERGY EFFICIENT AND LOW POWER DISTRIBUTED AUTOMATIC SPEECH RECOGNITION ON WEARABLE DEVICES

(71) Applicants: Binuraj K. Ravindran, Cupertino, CA (US); Francis M. Tharappel, Portland, OR (US); Prabhakar R. Datta, Portland, OR (US); Tobias Bocklet, Munich (DE); Maciej Muchlinski, Gdansk (PL); Tomasz Dorau, Gdansk (PL); Josef G. Bauer, Munich (DE); Saurin Shah, Portland, OR (US); Georg Stemmer, München (DE)

(72) Inventors: Binuraj K. Ravindran, Cupertino, CA (US); Francis M. Tharappel, Portland, OR (US); Prabhakar R. Datta, Portland, OR (US); Tobias Bocklet, Munich (DE); Maciej Muchlinski, Gdansk (PL); Tomasz Dorau, Gdansk (PL); Josef G. Bauer, Munich (DE); Saurin Shah, Portland, OR (US); Georg Stemmer, München (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/475,329

(22) Filed: Mar. 31, 2017

(65) Prior Publication Data

US 2018/0286414 A1 Oct. 4, 2018

(51) Int. Cl.
*G10L 15/30* (2013.01)
*G10L 25/24* (2013.01)
(Continued)

(52) U.S. Cl.
CPC .............. *G10L 25/24* (2013.01); *G10L 15/08* (2013.01); *G10L 15/30* (2013.01); *G10L 15/02* (2013.01);
(Continued)

(58) Field of Classification Search
None
See application file for complete search history.

(56) References Cited

U.S. PATENT DOCUMENTS 6,760,699 B1 * 7/2004 Weerackody ........... G10L 15/20
704/233
6,934,756 B2 8/2005 Maes
(Continued)

OTHER PUBLICATIONS

Tan et al., "Speech Recognition on Mobile Devices:Distributed and Embedded Solutions", Interspeech 2008, Brisbane, Australia, Sep. 22, 2008, 75 pages.

*Primary Examiner* — Abul K Azad
(74) *Attorney, Agent, or Firm* — Hanley, Flight and Zimmerman, LLC

(57) ABSTRACT

Methods, apparatus, systems and articles of manufacture are disclosed for distributed automatic speech recognition. An example apparatus includes a detector to process an input audio signal and identify a portion of the input audio signal including a sound to be evaluated, the sound to be evaluated organized into a plurality of audio features representing the sound. The example apparatus includes a quantizer to process the audio features using a quantization process to reduce the audio features to generate a reduced set of audio features for transmission. The example apparatus includes a transmitter to transmit the reduced set of audio features over a low-energy communication channel for processing.

29 Claims, 14 Drawing Sheets

(51) Int. Cl.
*G10L 15/08* (2006.01)
*G10L 15/02* (2006.01)
*G10L 19/032* (2013.01)
*H04W 4/80* (2018.01)
*G10L 25/78* (2013.01)

(52) U.S. Cl.
CPC ............ *G10L 19/032* (2013.01); *G10L 25/78* (2013.01); *G10L 2015/088* (2013.01); *H04W 4/80* (2018.02)

(56) References Cited

U.S. PATENT DOCUMENTS

| | | | |
|---|---|---|---|
| 8,768,712 B1* | 7/2014 | Sharifi | G10L 15/08 704/275 |
| 9,076,448 B2 | 7/2015 | Bennett et al. | |
| 9,128,283 B1 | 9/2015 | Heinrich et al. | |
| 9,158,116 B1 | 10/2015 | Osterhout et al. | |
| 9,342,829 B2 | 5/2016 | Zhou et al. | |
| 9,445,209 B2* | 9/2016 | Dadu | G06F 3/167 |
| 9,818,407 B1* | 11/2017 | Secker-Walker | G10L 15/32 |
| 2010/0106269 A1* | 4/2010 | Garudadri | G10L 19/032 700/94 |
| 2010/0174539 A1* | 7/2010 | Nandhimandalam | G10L 19/038 704/222 |
| 2013/0176626 A1 | 7/2013 | Heinrich et al. | |
| 2013/0195229 A1* | 8/2013 | Cheng | H04L 27/0014 375/343 |
| 2013/0249776 A1 | 9/2013 | Olsson et al. | |
| 2013/0258271 A1 | 10/2013 | Cazalet et al. | |
| 2014/0253867 A1 | 9/2014 | Jiang et al. | |
| 2015/0106085 A1* | 4/2015 | Lindahl | G10L 15/32 704/231 |
| 2016/0037486 A1* | 2/2016 | Wentzloff | H04W 52/0229 370/329 |
| 2016/0119770 A1* | 4/2016 | Ryu | H04W 8/005 370/328 |
| 2017/0083285 A1* | 3/2017 | Meyers | G10L 15/063 |
| 2018/0234765 A1* | 8/2018 | Torok | H04R 3/12 |

* cited by examiner

| SER | | SNR |
|---|---|---|
| 23 MFCCS | 13 MFCCS | |
| 6.5 | 6.9 | 1 |
| 2.7 | 2.9 | 5 |
| 1.7 | 1.8 | 9 |
| 1.3 | 1.5 | 13 |
| 1.0 | 1.2 | 17 |

FIG. 2

| TEST SET 330 | SNR [dB] 340 | SER 310 ||| 
| | | MFCC QUANTIZATION 320 |||
| | | 16 BIT/ NO QUANTIZATION 322 | 8-BIT/ METHOD1 324 | 8-BIT/ METHOD2 326 |
|---|---|---|---|---|
| i139e5400 (Large Vocabulary) | (MEDIUM) | 22.9 | 22.9 | 23.0 |
| i213tst (Large Vocabulary) | (HIGH) | 17.0 | 17.0 | 17.1 |
| itp40 hvphr pool (Medium Vocabulary) | 1 | 4.9 | 4.6 | 4.8 |
| itp40 hvphr pool (Medium Vocabulary) | 5 | 1.7 | 1.7 | 1.8 |
| itp40 hvphr pool (Medium Vocabulary) | 9 | 1.0 | 1.0 | 1.0 |
| itp40 hvphr pool (Medium Vocabulary) | 13 | 0.7 | 0.8 | 0.8 |
| itp40 hvphr pool (Medium Vocabulary) | 17 | 0.6 | 0.6 | 0.7 |

FIG. 3

SYSTEMS AND METHODS FOR ENERGY EFFICIENT AND LOW POWER DISTRIBUTED AUTOMATIC SPEECH RECOGNITION ON WEARABLE DEVICES

FIELD OF THE DISCLOSURE

This disclosure relates generally to automatic speech recognition, and, more particularly, to methods and apparatus for energy efficient and low power distributed automatic speech recognition on wearable devices.

BACKGROUND

Speech recognition requires a complicated, processor- and power-intensive set of operations. Since automated speech recognition generates a compute and memory intensive workload, speech recognition is not feasible to integrate into resource-constrained products.

BRIEF DESCRIPTION OF THE DRAWINGS

FIGS. 2-3 illustrate example quantization strategies.

DETAILED DESCRIPTION

Figure 1:
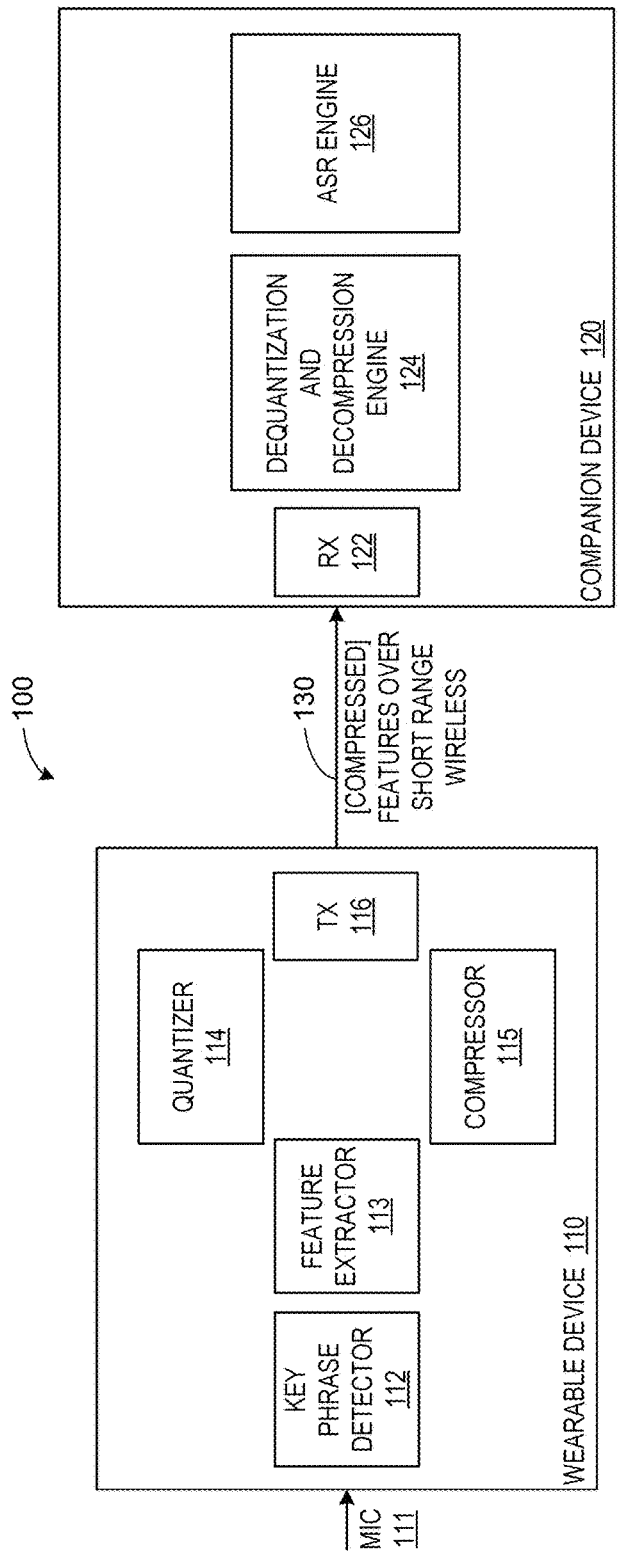
FIG. 1 is a high level diagram of a distributed automated speech recognition system in a wearable device context.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Speech recognition technologies can be useful in a variety of electronic devices, such as hearing aids, microphones, and/or other wearable and/or hearable products. Having an accurate, energy-efficient Automatic Speech Recognition (ASR) engine is an important component in the design of voice-enabled wearable or hearable products. Such wearable/hearable electronics can be limited by no display and/or lack of ability for interaction with the device. However, the ASR engine can be a compute and memory intensive processor, making it difficult to integrate locally (e.g., local ASR) on a resource constrained (e.g., small battery, form-factor-limited, limited processing power and memory) wearable or hearable product. Thus, certain examples provide a distributed ASR solution in which audio capture is done on the wearable device and raw/compressed audio is sent to a companion device or cloud over a short-range wireless or cellular connection for further processing.

However, transmitting raw audio over a short-range wireless connection can be expensive in terms of both power consumption and bandwidth usage. Audio can be compression but at the expense of the ASR detection accuracy.

In certain examples described herein, distributed ASR can be implemented with limited bandwidth over a connectivity channel while still maintaining ASR detection accuracy. Certain examples reduce device power consumption in an "always-on" distributed ASR solution on a wearable device to extend battery life of the wearable device. Using a more efficient audio front end and a voice trigger to control connectivity management in conjunction with reduced bandwidth requirements to transfer audio features over the connectivity channel with efficient quantization mechanisms enables efficient transfer of audio features to a companion device over the efficient communication channel. An ASR engine running on a companion device can accept the audio features as input at the companion device via the communication channel.

Rather than sending raw audio samples (higher bandwidth) or compressed audio over Bluetooth connection (lower bandwidth, reduced ASR detection accuracy) or speech/audio features (lower bandwidth) to the companion device, certain examples provide a power-efficient method of sending audio/speech features over Bluetooth Low Energy (BLE) channels or other lower energy connectivity solution to a companion device with reduced bandwidth using a quantization technique to maintain ASR detection accuracy. By effectively controlling connectivity channels based on input from a Voice Activity Detection (VAD) and Key phrase detector (KPD), reusing or maintaining the same building blocks, and using efficient BLE channels, better energy efficiency can be achieved compared to prior solutions.

FIG. 1 shows a high level description of a distributed ASR system 100 in a wearable device context. The example system 100 includes a wearable device 110 and a companion device 120. The example wearable device 110 includes a microphone 111, a key phrase detector 112, a feature extractor 113, a quantizer 114, a compressor 115, and a transmitter 116. The example companion device 120 includes a receiver 122, a dequantization and decompression engine 124, and an ASR engine 126.

In operation, the wearable device 110 collects an audio sample from the microphone (MIC) 111. The key phrase detector 112 triggers activation of the wearable device 110 to process the collected audio sample when certain key phrases associated with operation of the wearable device are identified. For example, certain words, phrases, and/or sounds can be associated with control/operation of the wearable device, and the key phrase detector 112 monitors the collected audio sample to identify such words, phrases, and/or sounds. Upon detection, the key phrase detector 112 can activate the wearable device 110 to process the received audio sample. The key phrase detector 112 allows the wearable device 110 to be "always on" while conserving power until a relevant audio sample is detected. In other examples, the wearable device 110 processes the received audio sample without regarding to identification of key phrases, etc., by the detector 112.

The wearable device 110 can then, optionally, extract audio features from the audio sample using the feature extractor 113. The extracted features and/or raw audio samples can be quantized by the quantizer 114 (also referred to as the quantization engine 114) and/or compressed by the compressor 115 (also referred to as the compression engine 115) for transmission by the transmitter 116 to the companion device 120 over a short range wireless communication channel 130 (e.g., Wi-Fi, BLE, Bluetooth, etc.). The companion device 120 (e.g., cellular phone, gateway device, and/or other hardware processing device) receives the audio information (e.g., features and/or raw audio samples) at the receiver 122, and the dequantization and decompression engine 124 decompresses and dequantizes (e.g., unmaps) the received audio information for processing by the ASR engine 126.

As shown in the example of FIG. 1, feature extraction and quantization (e.g., mapping, rounding, and/or truncating audio sample values) are performed in combination with Bluetooth Low Energy (BLE) and/or other low energy personal area network communication technology. Traditionally, solutions using Bluetooth and extracted features must compromise between bit-rate and accuracy. However, certain examples do not rely on Voice Activity Detection (VAD) and the key-phrase detector 112 to reduce power consumption. Rather, in certain examples, BLE and/or other low energy personal area network communication is used with compression over raw audio samples. An advantage of using compression and decompression is that the compression/decompression allows the wearable device and its audio data transmission to be used with any ASR engine. However, such solutions can increase power consumption for compression on the wearable device 110 (e.g., by a few tens of megahertz (MHz), etc.).

As shown in the example system 100 of FIG. 1, the key phrase detector 112 and feature extractor 113 are configured to reduce compute, memory, and bandwidth resources to reduce overall system power consumption. For example, speech and/or other audio features can be represented using mel frequency cepstral coefficients (MFCCs). MFCCs can represent extracted audio features for focused transmission and processing to facilitate automated speech recognition from the audio samples by the ASR engine 126.

In sound processing, a mel frequency cepstrum (MFC) is a representation of a short-term power spectrum of a sound based on a linear cosine transform of a log power spectrum on a nonlinear mel scale of frequency. MFCCs are coefficients that collectively make up an MFC. MFCCs can be derived from a type of cepstral representation of an audio sample. A cepstrum (reversing the first four letters of spectrum) is a result of an inverse Fourier transform (IFT) of a logarithm of an estimated spectrum of a signal. A mel frequency cepstrum (MFC) is a cepstrum in which the frequency bands are equally spaced on the mel scale, which approximates the human auditory system's response more closely than the linearly-spaced frequency bands used in the normal cepstrum. The adjusted spacing or warping of frequency bands can allow for better representation of sound in audio compression, for example.

MFCCs can be determined by taking the Fourier transform of an audio sample or signal. A resulting spectrum has associated powers which can then be mapped onto the mel scale using triangular overlapping windows. Then, the log of the power at each mel frequency can be determined, and a discrete cosine transform can be conducted for each mel log power as if the set of mel log powers were a signal. MFCCs can be extracted from the amplitudes of the resulting spectrum of frequencies.

Using MFCCs can streamline operation of the key phrase detector 112 and provide easily processible data packages to the ASR engine 126. The MFCCs generated by the key phrase detector 112 and/or the feature extractor 113 can be used by the ASR engine 126 to recreate the audio sample(s) for processing by the ASR engine 126, for example. For example, the ASR engine 126 can operate in two modes—a lower dimension processing mode (e.g., 13 MFCCs, etc.) and a higher dimension processing mode (e.g., 23 MFCCs, etc.). The compressor 115 and the dequantization and decompression engine 124 handle compression/decompression so that the ASR engine 126 can process audio data without compression/decompression overhead. The ASR engine 126 can be configured, improved, optimized, etc., for MFCC processing (e.g., through hardware acceleration and/or instruction extension, etc.) to leverage improved speed and accuracy and reduced power consumption, for example. In certain examples, the compressor 115 and decompression engine 124 can be optionally activated/deactivated depending upon audio sample size and power operating conditions, etc. In other examples, the compressor 115 and decompression may not be included. Instead, in some examples, quantization of the audio sample data by the quantizer 114 can be sufficient for BLE transmission over the communication channel 130 for dequantization by the engine 124 and processing by the ASR engine 126. Certain examples provide quantization techniques that can reduce transmitted MFCC values resulting in low bandwidth usage via BLE without compromising the ASR detection accuracy. Reducing the bandwidth usage over BLE can significantly reduce the power consumption of the wearable device 110 and/or the companion device 120 as well.

Certain examples provide an improved quantization technique for audio data transmission. The example quantization technique can be explained using a following example. Using 23 MFCCs in the ASR engine 126 involves a bandwidth of approximately 4.6 kilobytes per second (KBPS), assuming 2 bytes for each MFCC and calculating the MFCCs based on every 10 milliseconds (ms) of audio frames. Using vector quantification, for example, the involved bandwidth can be reduced to half or lower of the 4.6 KBPS (e.g., approximately 2.3 KBPS). Vector and/or other similar quantification introduces some computational complexity as well as degradation in ASR detection accuracy but saves bandwidth and power consumption, for example.

Vector quantization (also referred to as block quantization or pattern matching quantization) models probability density functions based on distribution of prototype vectors. Vector quantization can be used for data compression and works by dividing a set of points (vectors) into groups having approximately the same number of points closest to them. Each group is represented by its central or centroid point. Vector quantization can be used to identify density of data, which can be used in data compression, lossy data correction, density estimation, etc.

As shown in the table of FIG. 2, in certain examples, the MFCCs are reduced from 23 to 13 coefficients. In other examples, such as shown in the table of FIG. 3, a bit-width of the MFCC is reduced from 16 bits to 8 bits.

The example of FIG. 2 shows a sentence error rate (SER) 210 when using 23 MFCCs 220 and when using 13 MFCCs 230 for different signal-to-noise ratios (SNRs) 240. As shown in the table of FIG. 2, reducing the MFCC dimension from 23 220 to 13 230 coefficients can result in a 5-10% degradation in SER depending on the vocabulary size.

The example of FIG. 3 shows an SER 310 for each of a plurality of MFCC quantizations 320 for each of a plurality of test sets 330 with particular SNR 340. As shown in the example of FIG. 3, the MFCC quantization 320 includes no quantization (e.g., 16-bit MFCC) 322, 8-bit MFCC quantization according to a first method 324, and 8-bit quantization according to a second method 326.

The first method 324 is referred to as an A-law technique or algorithm. The A-law method 324 is a companding algorithm that enables compression and decompression (or compression and expansion, hence companding or compansion) across a channel with limited dynamic range. Using the A-law method 324, an analog signal, such as the audio sample and/or features extracted from the audio sample, can be modified for digitizing and communication via BLE on the communication channel 130. In the A-law method 324, a compression parameter, A (e.g., A=87.6, A=255, etc.), is used to encode the input signal according to:

$$F(x) = \text{sgn}(x) \begin{cases} \dfrac{A|x|}{1+\log(A)}, & |x| < \dfrac{1}{A} \\ \dfrac{1+\log(A|x|)}{1+\log(A)}, & \dfrac{1}{A} \le |x| \le 1 \end{cases} \quad \text{(Eq. 1)}$$

where sgn(x) extracts the sign of the real number x. Expansion according to the A-law method 324 is provided by an inverse of the function:

$$F^{-1}(y) = \text{sgn}(y) \begin{cases} \dfrac{|y|(1+\ln(A))}{A}, & |y| < \dfrac{1}{1+\ln(A)} \\ \dfrac{\exp(|y|(1+\ln(A))-1)}{A}, & \dfrac{1}{1+\ln(A)} \le |y| \le 1 \end{cases} \quad \text{(Eq. 2)}$$

Using a compression ratio of 2, the MFCC can be mapped from 16-bit integer features to 8-bit feature values without noticeable loss of accuracy at a very low computing cost with the A-law method 324.

The second method 326 is a truncation or discarding of bits from the MFCC values. For example, the second method 326 can include discarding the least significant 7 bits and most significant bit of the MFCCs to reduce the MFCCs from 16-bit values to 8-bit values. The second method 326 uses extremely low computing power for only minimal loss of accuracy.

As shown in the example table of FIG. 3, both method 1 324 and method 2 326 using 8-bit MFCCs produce SERs 310 equal to or within an acceptable tolerance of the 16-bit no quantization values 322 for a plurality of test sets 330 and SNRs 340.

Thus, as shown in the examples of FIGS. 2-3, the number of MFCCs can be reduced (FIG. 2) and/or the number of bits per MFCC can be reduced (FIG. 3) to reduce computing time, power consumption, and bandwidth for data transmission between the wearable device 110 and the companion device 120 via the communication channel 130. For example, power can be reduced by approximately half because the reduction in number and/or size of MFCCs reduces an amount of data to be transmitted. As a result, the transmitter 116 can be turned off when not in use, as can the key phrase detector 112, and/or other system 100 components not in use when audio is not being detected and/or processed. Thus, one or both of the wearable device 110 and the companion device 120 can operate in accordance with one or more modes including a voice activity detection mode, an active mode, a sleep mode, etc.

In certain examples, the system 100 (and/or the wearable device 110) can operate in a low power mode versus a high power mode. In the high power mode (e.g., high battery, etc.), the wearable device 110 can transmit 23 MFCCs. However, when the wearable device 110 transitions to the low power mode (e.g., low battery, etc.), only 13 MFCCs are transmitted by the wearable device 110 to the companion device 120.

Certain examples reduce or minimize the computation load on the wearable device 110 as well as the duration for which the communication channel 130 is active to reduce power consumption. Such examples involve careful management of compute and connectivity resources on the wearable device 110. Voice Activity Detection (VAD) and key phrase detection (KPD) can be used in conjunction with MFCC computation to manage resource usage on the wearable device 110, for example.

A plurality of events can occur during a key phrase-initiated command/control scenario. The key phrase detector 112 can enable the wearable device 110 to be active when voice activity is detected and when the user utters a key phrase. Selective or triggered enablement of the device 110 allows the device 110 to operate as a very-low-power-always-listening solution. In certain examples, the key phrase is followed by a command phrase (and/or other phrase to be detected) to be detected and interpreted following activation of the wearable device 110 based on the key phrase.

Figure 4:
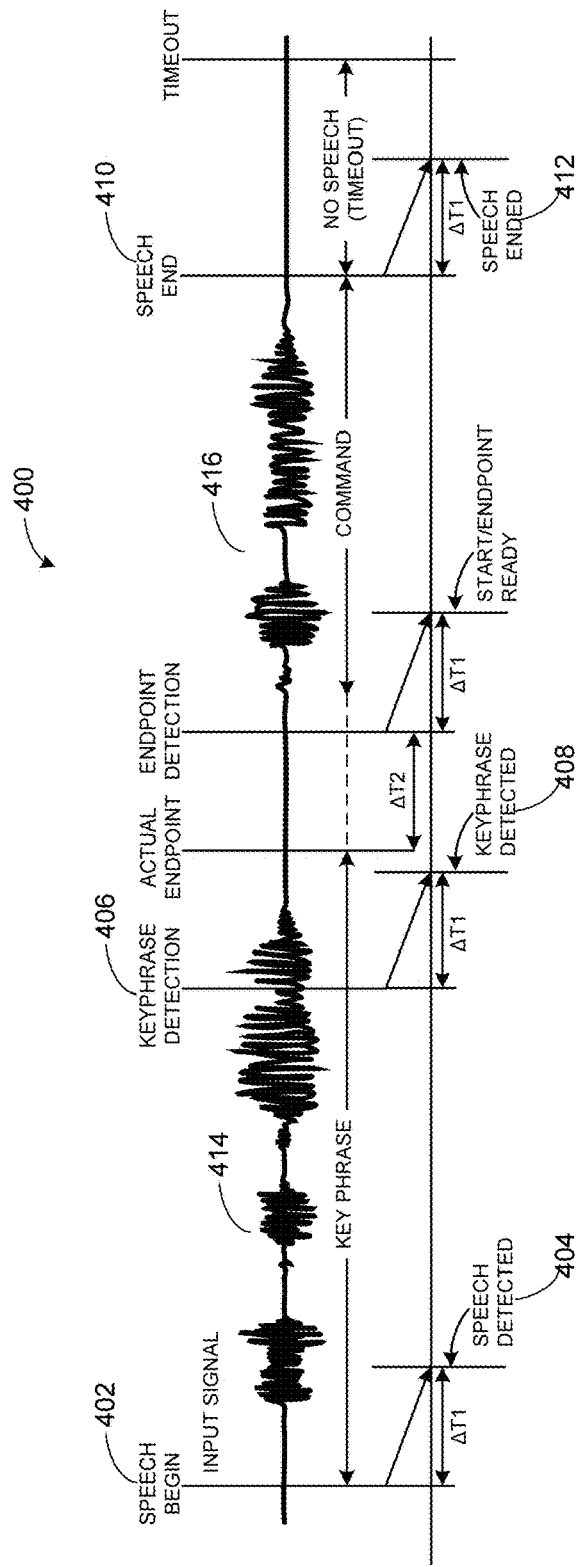
FIG. 4 illustrates an example speech waveform showing speech, key phrase, and/or command identification.

As illustrated in the example waveform 400 of FIG. 4, portions of speech can include speech begin 402, speech detected 404, key phrase detection 406, key phrase detected 408, speech end 410, and speech ended 412, for example. Speech begin 402 is an actual beginning of a speech. Speech detected 404 is a time stamp when speech was detected by the wearable device 110 due to a processing delay or latency by the microphone 111 and/or key phrase detector 112, for example. Key phrase detection 406 is when a score matching, correlating, or otherwise associating the collected audio sample with a known/recorded audio signature or sample crossed the threshold (e.g., indicating that the collected audio sample includes or otherwise corresponds to a key phrase, etc.), for example. Key phrase detected 408 is a point in time when detection of a key phrase 414 in the audio sample is reported after processing delay by the key phrase detector 112, for example. Speech end 410 is an actual end of collected speech, and speech ended 412 is a time stamp at which the speech end was detected.

As shown in the example of FIG. 4, the speech 400 can include a command 416 as well as the key phrase 414. The key phrase 414 can trigger the key phrase detector 112 and/or feature extractor 113 to process audio after the key phrase 414 to identify the command 416. The identified command 146 can be processed for execution, for example, after audio features (e.g., MFCCs, etc.) have been generated, transmitted, and processed.

Using key phrase detection to trigger activation of the rest of the wearable device 110 can conserve power at the wearable device 110, reduce computations by components of the wearable device 110, and reduce the duration during which the communication channel 130 is active to transmit MFCCs to the companion device 120, for example. Since the MFCC is the common building block for KPD and MFCC streaming, a reduction in computation and/or size of each MFCC (e.g., through MFCC size reduction, instruction extension on a reconfigurable processor, etc.) provides benefits in efficiency, timeliness, and power consumption for the wearable device 110, for example.

Figure 5:
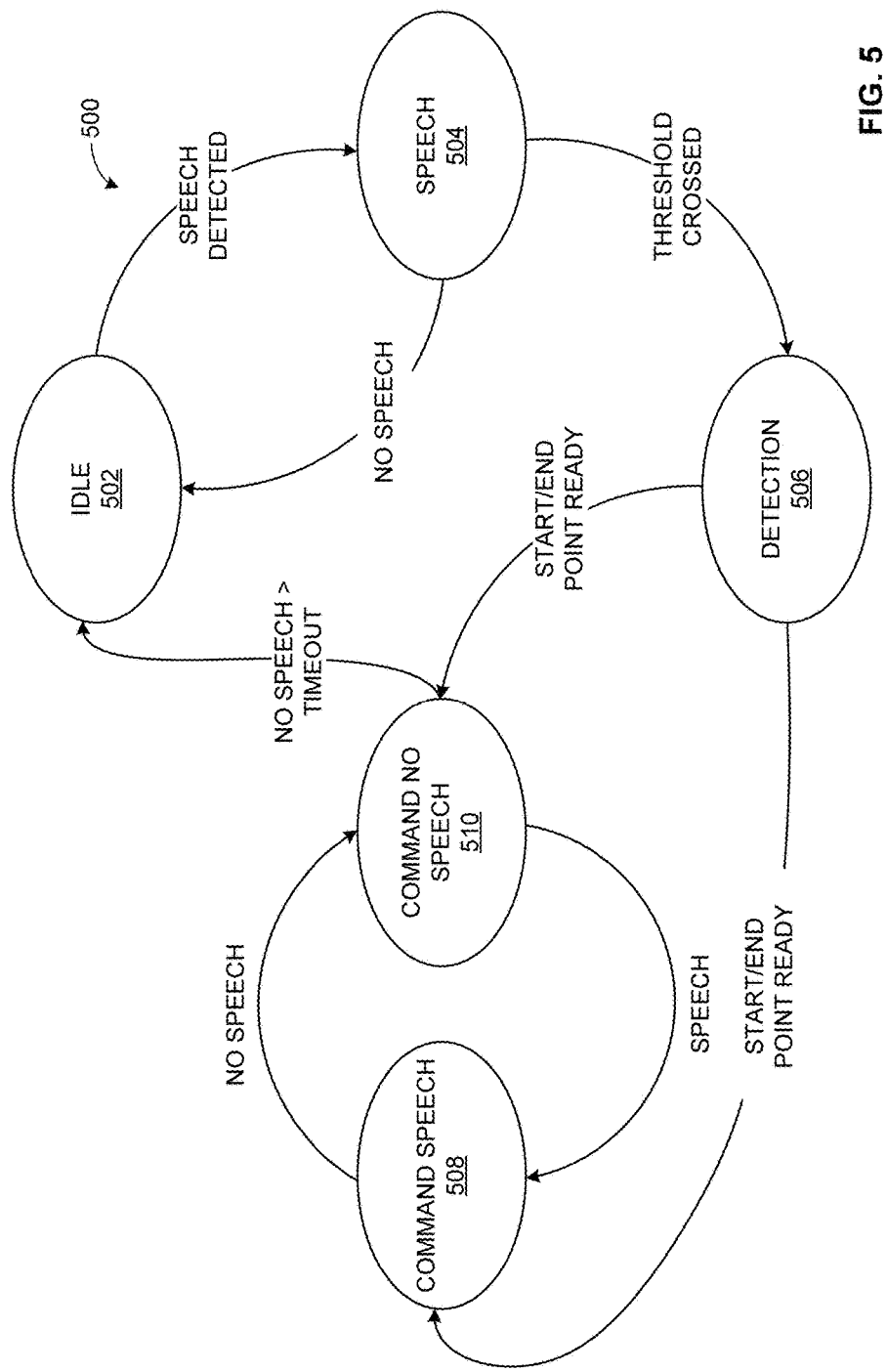
FIG. 5 illustrates an example state diagram showing states of key phrase and command detection.

FIG. 5 illustrates an example diagram of states and state transitions 500 for the wearable device 110. As shown in the example of FIG. 5, the key phrase detector 112 of the wearable device 110 operates through at least five states during key phrase detection and command phrase detection stages for compute and connectivity management. States include idle 502, speech 504, detection 506, command speech 508, and command no speech 510, for example.

For example, when the wearable device 110 is powered on, the device 110 is operating in an "always listening" mode in the "IDLE" state 502 and listening for speech. When speech is detected (e.g., via the microphone 111 and the key phrase detector 112) the state changes from "IDLE" 502 to "SPEECH" 504. While in the "SPEECH" state 504, the wearable device 110 parses the audio data packets and checks if the keyword is spoken using the key phrase detector 112. When the keyword is detected, the state is changed to "DETECTION" 506. The keyword can be followed by a command phrase such as "When is my next meeting". If a command phrase is detected within a certain period of time (e.g., in milliseconds, as configured by the user), then the state is changed to "COMMAND SPEECH" 508. If there is silence for a longer period, then the state is changed to "COMMAND NO SPEECH" 510 and eventually back to the IDLE state 502. When the wearable device 110 is in IDLE state 502, a BLE connection with the companion device 120 is established via the communication channel 130 without streaming of data. Streaming of MFCC coefficients is started when the wearable device 110 state changes to "DETECTION" 506 and continues until the state becomes "COMMAND NO SPEECH" 510.

In certain examples, the BLE connection communication channel 130 with the companion device 120 is to be established prior to a DETECTION state 506 (and ready for streaming) because establishing a connection takes longer, and the connection via channel 130 might lose packets if the connection channel 130 is established only after DETECTION state 506 is detected. However, streaming of MFCCs and/or other audio features is started after the DETECTION state 506 and is stopped when the state becomes "COMMAND NO SPEECH" 510, for example. Thus, power consumption from BLE streaming can be reduced or minimized.

After the key phrase has been identified by the key phrase detector 112, the feature extractor 113 processes audio frames of speech and/or other sound (e.g., including and/or following the identified key phrase or portion thereof) to extract features for packetization and transfer over the BLE communication channel 130. In certain examples, a number of bytes in a feature-descriptor packet (e.g., 23 MFCCs, etc.) does not match a BLE packet size (e.g., 20 bytes, etc.), MFCC data is packetized and segmented for BLE transmission over the communication channel 130.

For example, the MFCC set (e.g., 23 bytes, etc.) is to be streamed to the companion device 120 via the BLE communication channel 130 for processing by the ASR engine 226 with reduced or minimal latency and reduced or minimal loss and/or corruption. For example, MFCCs representing a command and/or key phrase, etc., are generated and transmitted to the companion device 120 for further processing. Packetization by the quantizer 114 and/or the compressor 115 is used to match the BLE limitation of 20 bytes for the payload for the connection events. One or more packetization technologies can be employed. Example packetization techniques involve adding a header to certain MFCC sets.

For example, a header of 8 bytes can be added to every 4 MFCC sets. The 8-byte header includes a start of frame (SOF), a sequence number, and padding bytes. Using such packetization, a 100-byte set is evenly transmitted over the communication channel 130 via BLE as 5 packets. Using this packetization scheme reduces or minimizes computation of packet loss/corruption/recovery to every fourth MFCC set. However, corruption can invalidate all 4 MFCC sets.

In another example, a header of 2 bytes is added to every MFCC set. The 2-byte header includes a SOF and a sequence number. Using this scheme reduces or minimizes latency as BLE packets are sent as MFCC packets arrive. This packetization schemes improves loss recovery (e.g., a header from every packet) but is more compute intensive and power intensive.

Figure 6:
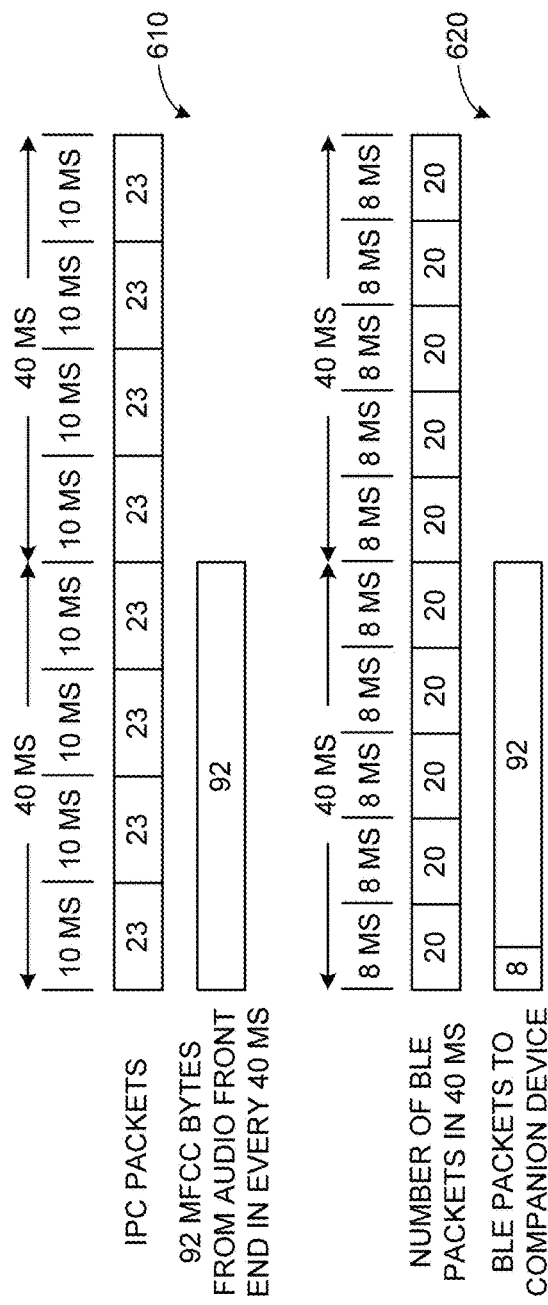
FIGS. 6-7 illustrate example packetization techniques.
Figure 7:
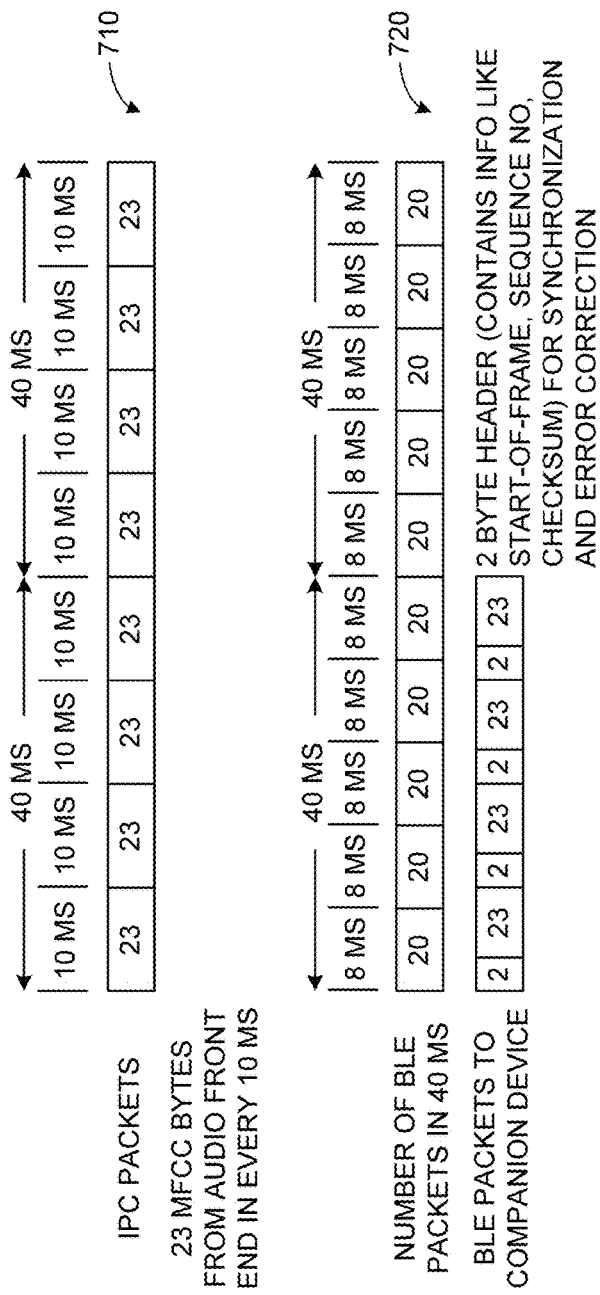

FIGS. 6-7 illustrate example packetization details for the 8- and 2-byte header technologies described above. As shown in the example of FIG. 6, packets 610 (e.g., inter-process communication (IPC) and/or other data packets, etc.) can be transmitted in chunks of 23 packets every 10 ms for a total of 92 bytes every 40 ms. However, using the 8-byte header alignment technique 620, 20 BLE data packets can be transmitted every 8 ms. The packets are broken up into an 8-byte header followed by 4 sets of MFCC packets for a total of 8 header packet bytes and 92 MFCC packet bytes transmitted from the wearable device 110 to the companion device 120 over the communication channel 130 every 40 ms, for example. The example 8-byte header can include a start-of-frame, sequence number, checksum, and possible padding, etc., for synchronization and error correction, for example.

As shown in the example of FIG. 7, IPC packets 710 can be transmitted in groups of 23 bytes every 10 ms for a total of 92 bytes every 40 ms. However, using the 2-byte header alignment technique 720, 20 BLE data packets can be transmitted every 8 ms. The packets are broken up into a 2-byte header followed by 23 bytes of BLE MFCC packets for a total of 8 header packet bytes and 92 MFCC packet bytes transmitted from the wearable device 110 to the companion device 120 over the communication channel 130 every 40 ms, for example. The example 2-byte header can include a start-of-frame, sequence number, checksum, and possible padding, etc., for synchronization and error correction, for example.

Depending on environmental conditions, scenario, etc., either of these approaches can be adopted. Additionally, BLE configuration can be changed so that buffering of the MFCC packets can be controlled. In some configurations, one or more packets can be sent in one connection interval to optimize and/or otherwise improve bandwidth and power consumption. Thus, a better energy efficiency can be achieved compared to existing solutions to implement distributed ASR solutions for wearable devices by effectively controlling the connectivity channels based on input from voice activity.

Figure 8:
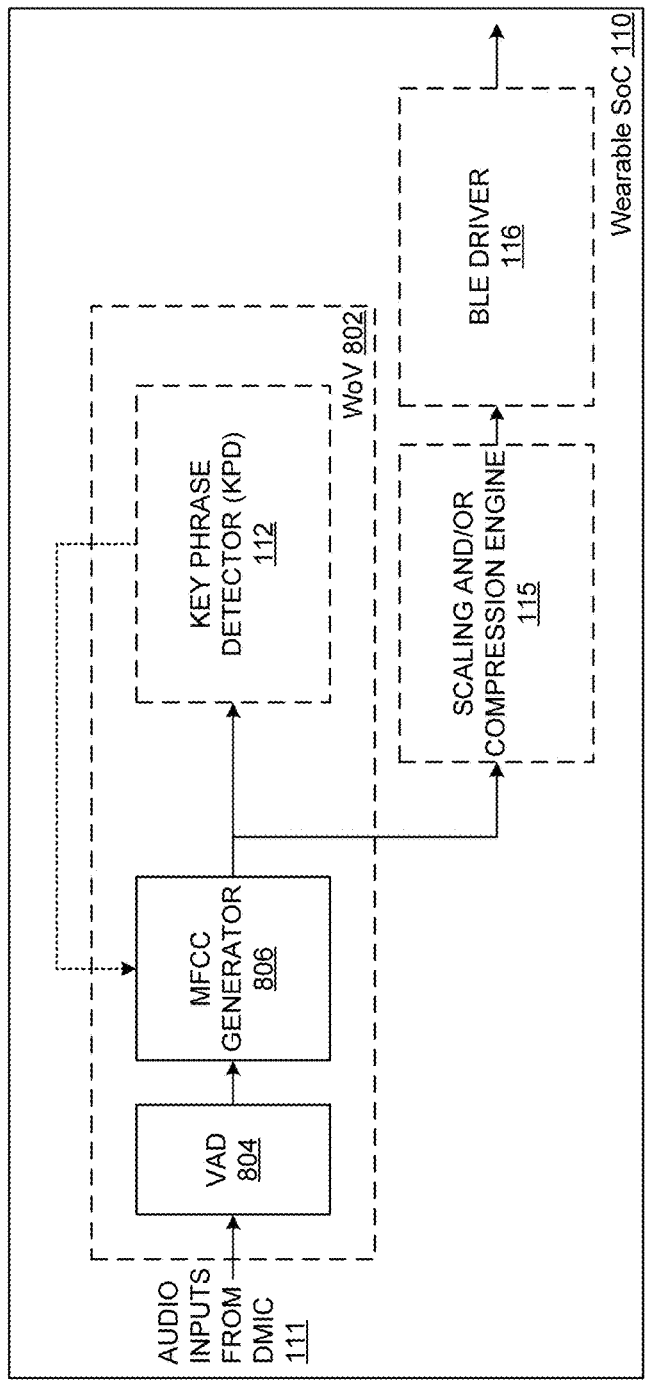
FIG. 8 illustrates an example implementation of the wearable device of FIG. 1 as a wearable system-on-a-chip.

Thus, MFCCs can be used with VAD to trigger key phrase detection and packaging/packetizing for transmission from the wearable device 110 to the companion device 120 via the BLE communication channel 130, for example. In certain examples, the wearable device 110 of FIG. 1 can be implemented as a wearable system-on-a-chip (SoC) 110 as shown in FIG. 8. In the example of FIG. 8, audio input(s) from the digital microphone (DMIC) 111 are provided to a Wake on Voice (WoV) circuit 802. The WoV circuit 802 includes a voice activity detector (VAD) 804. The VAD 804 activates the WoV circuit 802 based on the received audio input from the DMIC 111. The VAD 804 triggers generation of MFCCs by an MFCC generator 806 from the audio input(s). The MFCCs are provided to the key phrase detector (KPD) 112, which provides feedback to the MFCC generator 806. The MFCCs are also routed to the scaling and/or compression engine 115. The scaling and/or compression engine 115 processes the MFCCs to prepare them for transmission (e.g., using an alignment scheme such as an 8-byte header for every four 23-byte MFCC coefficient sets, a 2-byte header for every MFCC coefficient set, etc.). The transmitter BLE driver 116 transmits the stream of data packets over the BLE communication channel 130 to the companion device 120. A-law and/or truncation of bits can be used to shorten MFCCs to 8-bit values for bundling with 8- and/or 2-byte headers, for example.

Thus, certain examples provide improved audio sample analysis and communication by offloading speech recognition and/or additional audio feature processing from the wearable device 110 to the companion device 120 while at the same time conserving power at the wearable device 110 and reducing use of the communication channel 130 through technically improved BLE, quantization, and compression strategies. Certain examples facilitate improved data delivery and speech recognition response through intelligent transmission and processing of speech feature data. Certain examples facilitate delivery of a better usage experience to users of the example platform 100.

While example implementations of the system 100, the wearable device 110, microphone 111, key phrase detector 112, feature extractor 113, quantizer 114, compressor 115, transmitter 116, companion device 120, receiver 122, dequantization and decompression engine 124, ASR engine 126, communication channel 130, WoV 802, VAD 804, MFCC generator 806, etc., are illustrated in FIGS. 1-8, one or more of the elements, processes and/or devices illustrated in FIGS. 1-8 may be combined, divided, re-arranged, omitted, eliminated and/or implemented in any other way. Further, the example wearable device 110, microphone 111, key phrase detector 112, feature extractor 113, quantizer 114, compressor 115, transmitter 116, companion device 120, receiver 122, dequantization and decompression engine 124, ASR engine 126, communication channel 130, WoV 802, VAD 804, MFCC generator 806, and/or, more generally, the example system 100 of FIGS. 1-8 can be implemented by hardware, software, firmware and/or any combination of hardware, software and/or firmware. Thus, for example, any of the example wearable device 110, microphone 111, key phrase detector 112, feature extractor 113, quantizer 114, compressor 115, transmitter 116, companion device 120, receiver 122, dequantization and decompression engine 124, ASR engine 126, communication channel 130, WoV 802, VAD 804, MFCC generator 806, and/or, more generally, the example system 100 of FIGS. 1-8 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wearable device 110, microphone 111, key phrase detector 112, feature extractor 113, quantizer 114, compressor 115, transmitter 116, companion device 120, receiver 122, dequantization and decompression engine 124, ASR engine 126, communication channel 130, WoV 802, VAD 804, MFCC generator 806, and/or, more generally, the example system 100 of FIGS. 1-8 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-8 may include one or more elements, processes and/or devices in addition to, or instead of, those illustrated in FIGS. 1-8, and/or may include more than one of any or all of the illustrated elements, processes and devices.

Flowcharts representative of example machine readable instructions for implementing the system 100 of FIGS. 1-8 are shown in FIGS. 9-12. In these examples, the machine readable instructions comprise a program for execution by a processor such as the processor 1312, 1412 shown in the example processor platform 1300, 1400 discussed below in connection with FIGS. 13, 14. The program may be embodied in software stored on a tangible computer readable storage medium such as a CD-ROM, a floppy disk, a hard drive, a DVD, a Blu-ray disk, or a memory associated with the processor 1312, 1412, but the entire program and/or parts thereof could alternatively be executed by a device other than the processor 1312, 1412 and/or embodied in firmware or dedicated hardware. Further, although the example programs are described with reference to the flowcharts illustrated in FIGS. 9-12, many other methods of implementing the example system 100 may alternatively be used. For example, the order of execution of the blocks may be changed, and/or some of the blocks described may be changed, eliminated, or combined.

As mentioned above, the example processes of FIGS. 9-12 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
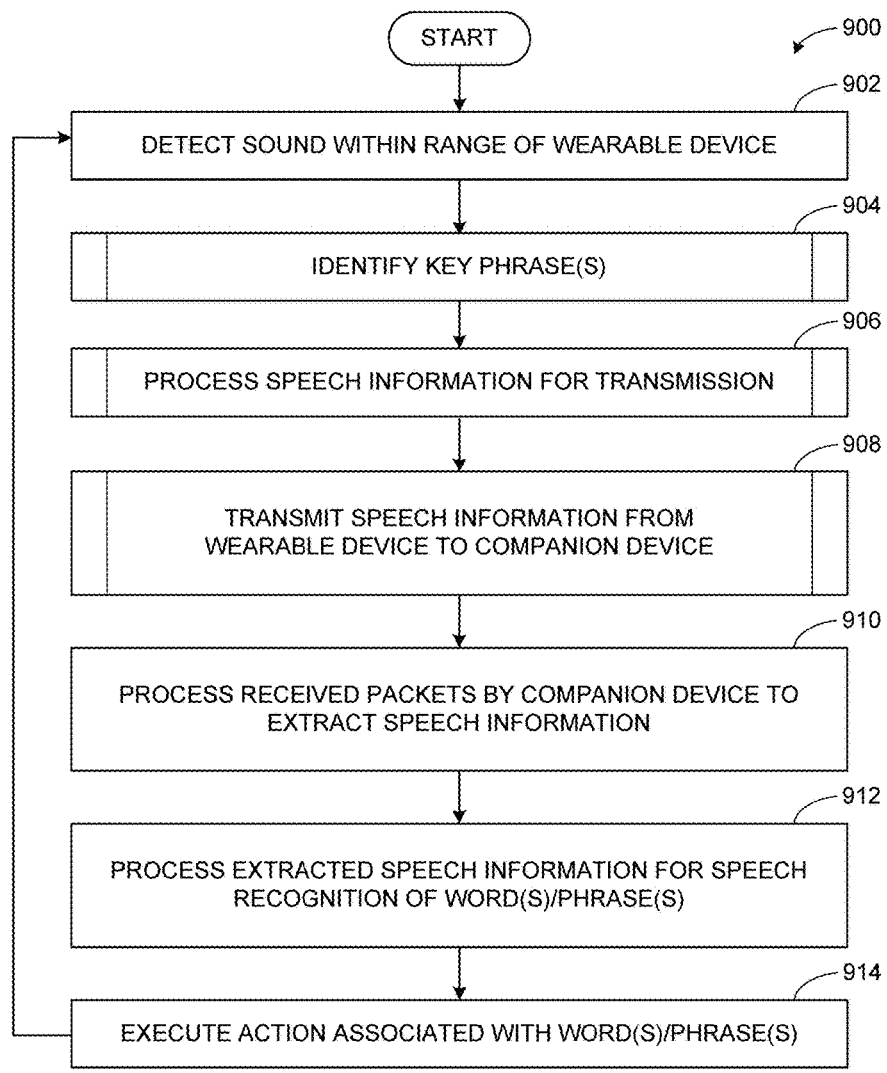
FIGS. 9-12 illustrate flow diagrams representative of example machine readable instructions that can be executed to implement the example systems of FIGS. 1-8.

The program 900 of FIG. 9 begins at block 902. At block 902, sound is detected within range of the wearable device 110. For example, the microphone 111 detects a voice within range of the wearable device 110. Using voice activity detection, the key phrase detector 112 and/or the VAD 804 can activate or "wake" wearable device 110 circuitry for speech processing for the detected audio sample.

At block 904, key phrases are identified. For example, the key phrase detector 112 looks for the start of the speech in the detected audio sample and processes the sound to identify characteristics of the sound wave to indicate the presence of a key phrase in the sound (e.g., recognized sounds indicating letters, words, etc., forming phrases versus background noise, etc.). In some examples, the VAD 804 detects speech activity and the MFCC generator 806 generates MFCCs from the detected audio sample and provides the MFCCs to the key phrase detector 112 to identify key phrases. Key phrases can include spoken phrases to record, transcribe, send, etc., and/or commands to execute, for example. For example, key phrases can include groups of words of four to five syllables such as "Hello Computer", "Hello Device", etc. In certain examples, other audio/wake-up events can include sounds to trigger an alert, alarm, and/or other notification at the wearable device 110 and/or companion device 120 such as glass breaking, baby crying, television on, appliance running, etc.

At block 906, the speech information is processed for transmission. For example, MFCCs and/or other audio feature(s) associated with audio frame(s) associated with identified key phrase(s) (e.g., identified by the feature extractor 113 from audio frame(s) following key phrase identification, etc.) are processed (e.g., quantized) in preparation for transmission, such as by reducing a number of MFCCs to transmit (e.g., from 23 to 13, etc.), performing an A-law function to reduce a number of bits in each MFCC (e.g., to map each MFCC from 16-bits to 8-bits using Equations 1-2, etc.), and/or truncating each MFCC to discard bits to reduce a number of bits in each MFCC (e.g., discarding the least 7 bits and most significant bit in each MFCC, etc.), etc. Thus, for example, audio feature(s) corresponding to a command in audio frame(s) following an identified key phase can be processed and reduced for transmission. Resulting MFCC and/or other audio feature information for audio frames can also be compressed by the compressor 115, such as using vector compression, statistical compression, etc.

For example, once all or part of a key phrase is identified, the speech and/or other audio following the key phrase can be segmented into audio frames (e.g., groups of 5 ms, 10 ms, 20 ms, etc.) and audio features (e.g., MFCCs, etc.) are extracted for each frame. Thus, audio frames can be processed to identify and extract MFCCs and group and process the MFCCs for each segment of speech, for example.

At block 908, the speech information is transmitted from the wearable device 110 to the companion device 120 via the communication channel 130. For example, the transmitter 116 sends the data packets over the BLE and/or other low energy wireless communication channel 130 to the companion device 120. The data packets can be aligned using periodic header bytes (e.g., an 8-byte header for every 4 MFCC sets, a 2-byte header for every MFCC set, etc.) to reduce latency as well as loss/corruption according to the BLE limitation of 20 bytes for payload for communication connection events.

At block 910, the received packets are processed by the companion device to extract speech information. For example, received MFCC and/or other audio feature data packets can be dequantized, decompressed, and/or otherwise processed to extract the MFCC information. In certain examples, lost packets can be recreated based on surrounding packet information. For example, suppose packets 1, 2, 3, 4, and 5 have been transmitted from the edge wearable device 110 to the companion device 120. Packets 2 and 4 are lost or corrupted. Packet MFCC and/or other audio feature values can be interpolated from adjacent packet values, for example, such that packet 2 can be created from adjacent packets 1 and 3, and packet 4 can be created from adjacent packets 3 and 5. Thus, using packet sequence number, packets can be recovered without appreciable degradation in quality if adjacent packet information is available.

At block 912, the extracted speech information is processed for speech recognition to determine associated word(s)/phrase(s). For example, the MFCCs and/or other audio features are processed by the ASR engine 126 to identify the word(s) and/or phrase(s) associated with the MFCCs of the speech information. In certain examples, the word(s) and/or phrase(s) correspond to human speech. In other examples, audio event(s) other than word(s) and/or phrase(s) correspond to sounds such as glass breaking, baby crying, television turned on, appliance running, doorbell ringing, etc. In certain examples, by reusing MFCCs from the wearable device 110 to the companion device 120, resource usage (e.g., firmware memory, power consumption, processing, etc.) can be reduced, and speech recognition accuracy can be improved.

At block 914, an action associated with the word(s)/phrase(s)/sound(s) is can be executed. For example, if the identified word(s) and/or phrase(s) include a command, the command can be executed by the companion device 120 and/or the wearable device 110. Identified text can also be stored and/or input into another program, for example. In certain examples, feedback can be provided from the companion device 120 to the wearable device 110 based on identified word/phrase content. For example, the companion device 120 can provide feedback to the wearable device 110 based on quality of received speech information to modify a setting, quantization method, compression technique, etc. For example, the wearable device 110 and/or the companion device 120 can include a model (e.g., a machine learning model) that is updated based on processed speech information to ignore background noise, etc. Feedback can be provided as audio, text, and/or other data feedback, for example.

Thus, certain examples provide an SoC for wearable and Internet-of-Things applications involving battery-operated and low power profile devices. Certain examples enable activity tracking for audio events, voice control, remote control, emergency assistance, etc. In certain examples, the audio processing of the system 100 can be combined with a motion sensor to correlate sound with movement, etc.

Figure 10:
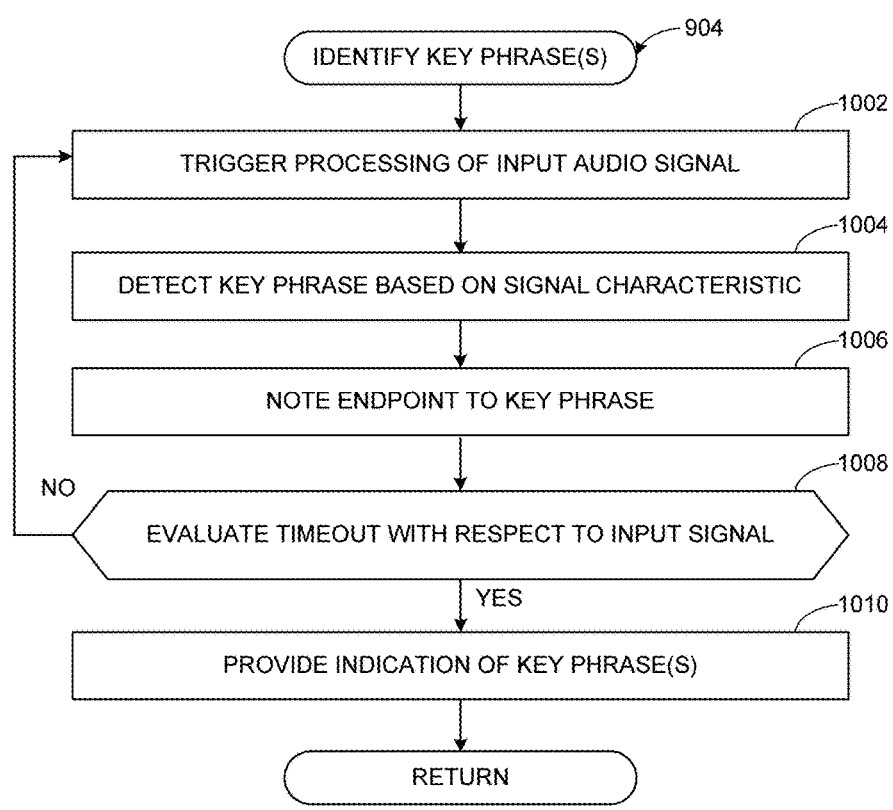

Additional detail associated with identifying key phrase(s) (block 904) is shown in the example of FIG. 10. At block 1002, detected audio triggers the key phrase detector 112 to process an incoming audio sample. For example, the key phrase detector 112 can be in a powered off, low power, or sleep mode, etc., until the detected audio triggers the detector 112 and/or other WoV 802 component to "wake up".

At block 1004, a key phrase is detected based on a signature or characteristic of the sound waveform. For example, if a frequency or duration threshold is crossed, then the key phrase detector 112 identifies the sound as a key phrase.

At block 1006, an endpoint to the key phrase is noted. For example, if the sound attenuates below a threshold or no sound is detected for a time period, then the key phrase detector 112 determines that the phrase is complete and ends the sample associated with the key phrase.

At block 1008, a timeout is evaluated. For example, the key phrase detector 112 includes a certain time period to wait to detect additional sound. If further sound is detected in the time period, then control reverts to block 1004 to detect the next key phrase. If no further sound is detected in the time period (e.g., no sound registering above a certain noise threshold, etc.), then, at block 1010, the key phrase(s) are provided to the quantizer 114 and/or compressor 115 (e.g., block 906) to be prepared and packetized for transmission.

Figure 11:
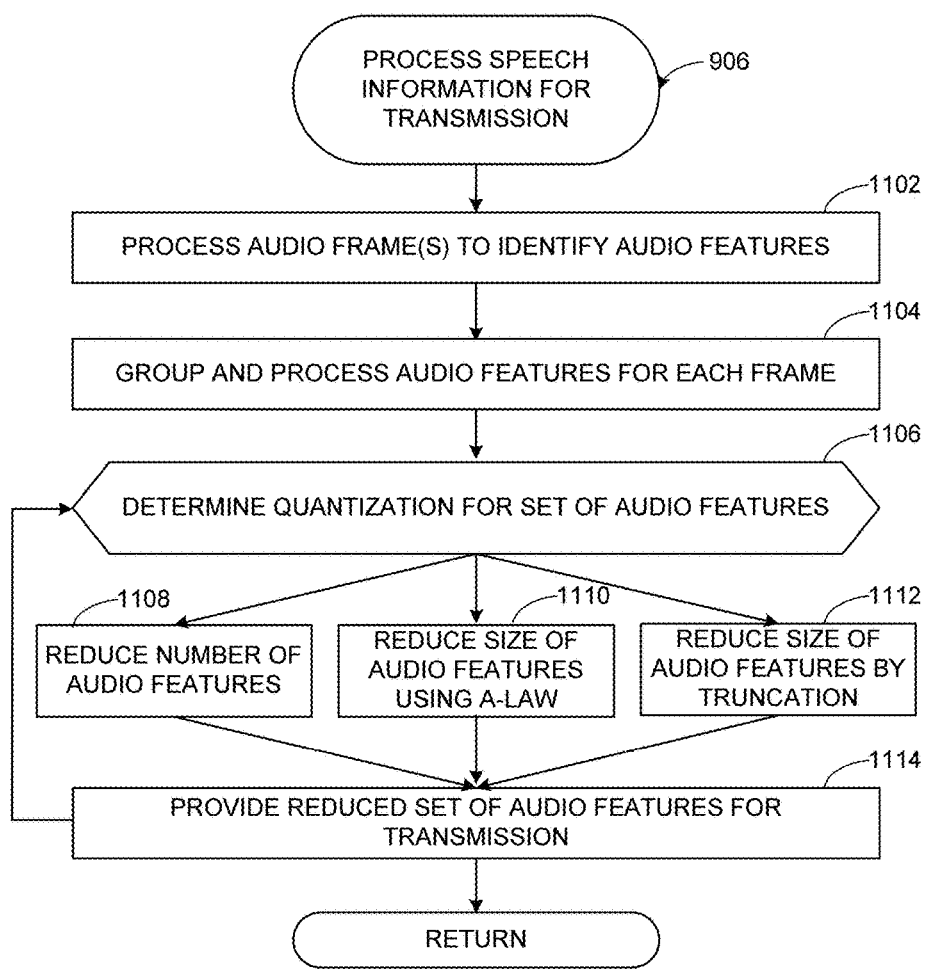

Additional detail associated with processing speech information for transmission (block 906) is shown in the example of FIG. 11. At block 1102, audio frames (e.g., audio frames including and/or following the key phrase(s), etc.) are processed to identify the audio features (e.g., MFCCs, etc.) in and/or following each key phrase (e.g., the key phrase, a command following the key phrase, another audio event, etc.). For example, the feature extractor 113 extracts MFCC and/or other audio feature information from the key phrase(s). In certain examples, a fragment or partial key phrase triggers the processing of speech information. In certain examples, an entire key phrase is identified to trigger the processing of speech information.

At block 1104, the audio features (e.g., MFCCs, etc.) are grouped for each key phrase and processed in preparation for transmission. For example, a key phrase can include 23 MFCCs associated with the sounds of the key phrase and/or audio frames following the key phrase (e.g., command, audio event, etc.). The 23 MFCCs can be grouped for transmission in representation of the key phrase, for example.

At block 1106, a quantization technology is determined for application to the set of audio features (e.g., MFCCs, etc.). For example, the wearable device 110 can have a preconfigured and/or hardcoded quantization technique to process the set of audio features (e.g., MFCCs, etc.) for data transmission to the companion device 120. In other examples, the quantizer 114 of the wearable device 110 can select (e.g., dynamically select) a quantization strategy based on resource availability and/or other operating condition (e.g., bandwidth, power, amount of data, etc.). For example, the quantizer 114 can determine whether a reduction in number of audio features (e.g., MFCCs, etc.) and/or a reduction in audio feature bit size is applicable to the set of audio features to be transmitted.

If the quantization is a reduction in the number of audio features in the set to be transmitted, then, at block 1108, the set of audio features (e.g., MFCCs, etc.) is reduced according to a parameter associated with the audio feature set size. For example, a set of 23 MFCCs can be reduced to 13 MFCCs for transmission to the companion device 120 for speech recognition and further processing.

If the quantization is a combination of bits in each audio feature, then, at block 1110, the audio features (e.g., MFCCs, etc.) in the set of audio features are reduced such as using the A-law function of Equations 1-2 to reduce the number of bits in each audio feature from 16-bits to 8-bits, etc. If the quantization is a truncation or discarding of bits in each audio feature, then, at block 1112, the audio features in the set of audio features are truncated such as by discarding the least 7 bits and most significant bit in each audio feature, etc.

At block 1114, the reduced set of audio features (e.g., MFCCs, etc.) is provided for transmission. In certain examples, compression (e.g., vector compression, statistical compression, etc.) can be applied by the compressor 115 if bandwidth and/or power restrictions, etc., dictate sending less information than raw audio feature (e.g., MFCC, etc.) data packets. At block 1114, if additional sets of audio features remain to be processed, control reverts to block 1106. Otherwise, control returns to block 908.

Figure 12:
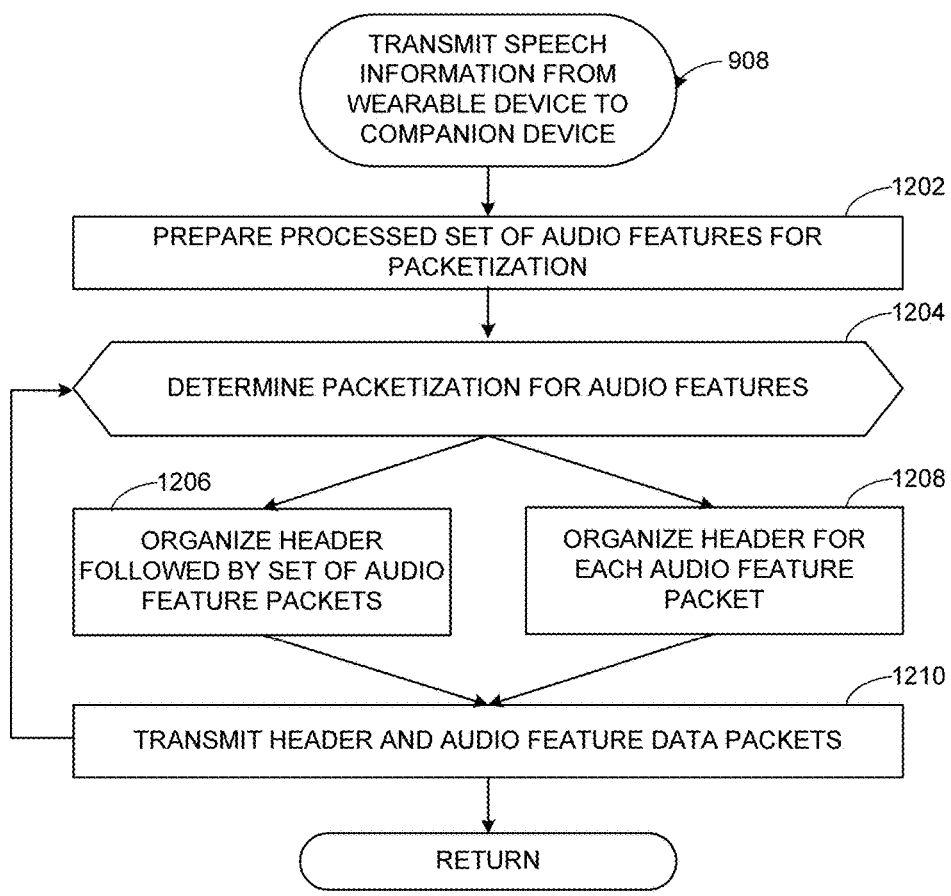

Additional detail associated with transmitting the speech information from the wearable device 110 to the companion device 120 (block 908) is shown in the example of FIG. 12. At block 1202, a processed set of audio features (e.g., MFCCs, etc.) is prepared for packetization. For example, the MFCCs are organized into a number of bytes for transmission. For example, MFCCs are organized into packets to accommodate the BLE limit of 20 packets per 20 ms for transmission over the low power communication channel 130.

At block 1204, a packetization technique is determined. For example, a packetization technique may be preconfigured and/or hardcoded into the transmitter 116. In other examples, a packetization technique can be dynamically determined based on resource availability and/or other operating condition (e.g., bandwidth, power, amount of data, etc.). For example, MFCC data packets can be aligned using periodic header bytes (e.g., an 8-byte header for every 4 MFCC sets, a 2-byte header for every MFCC set, etc.) to reduce latency as well as loss/corruption according to the BLE limitation of 20 bytes for payload for communication connection events.

If a single header is to be transmitted with a group of audio feature (e.g., MFCC, etc.) packets, then, at block 1206, the audio feature packets are organized to include a header packet followed by a set of audio feature packets. For example, an 8-byte header packet is to be transmitted followed by 4 MFCC packets over the BLE communication channel 130. Using this scheme, a header of 8 bytes and 4 MFCC packets of 23 bytes each are transmitted over the BLE communication channel 130 as 5 packets of data forming a 100-byte set. Using this scheme reduces computation of packet loss, corruption, and/or recovery to every fourth MFCC set, but corruption can invalidate all four MFCC sets associated with the particular header, for example.

If a header is to be transmitted with a header for each audio feature (e.g., MFCC, etc.) data packet, then, at block 1208, the audio feature packets are organized to include a header transmitted before each audio feature packet. For example, a 2-byte header is to be transmitted followed by 23 bytes of MFCC packets over the BLE communication channel 130. Using this scheme, a header of 2 bytes and an MFCC packet of 23 bytes are transmitted over the BLE communication channel 130. Using this scheme reduces latency by sending BLE packets as MFCC packets arrive at the transmitter 116 for transmission. Additionally, computation of packet loss, corruption, and/or recovery is limited to a single MFCC packet, but processing is more compute and power intensive, for example.

At block 1210, the header and audio feature (e.g., MFCC, etc.) data packets are transmitted to the companion device via the communication channel 130 according to the specified arrangement. If additional packets remain to be transmitted, control returns to block 1202. Alternatively or in addition, control reverts to block 910.

Figure 13:
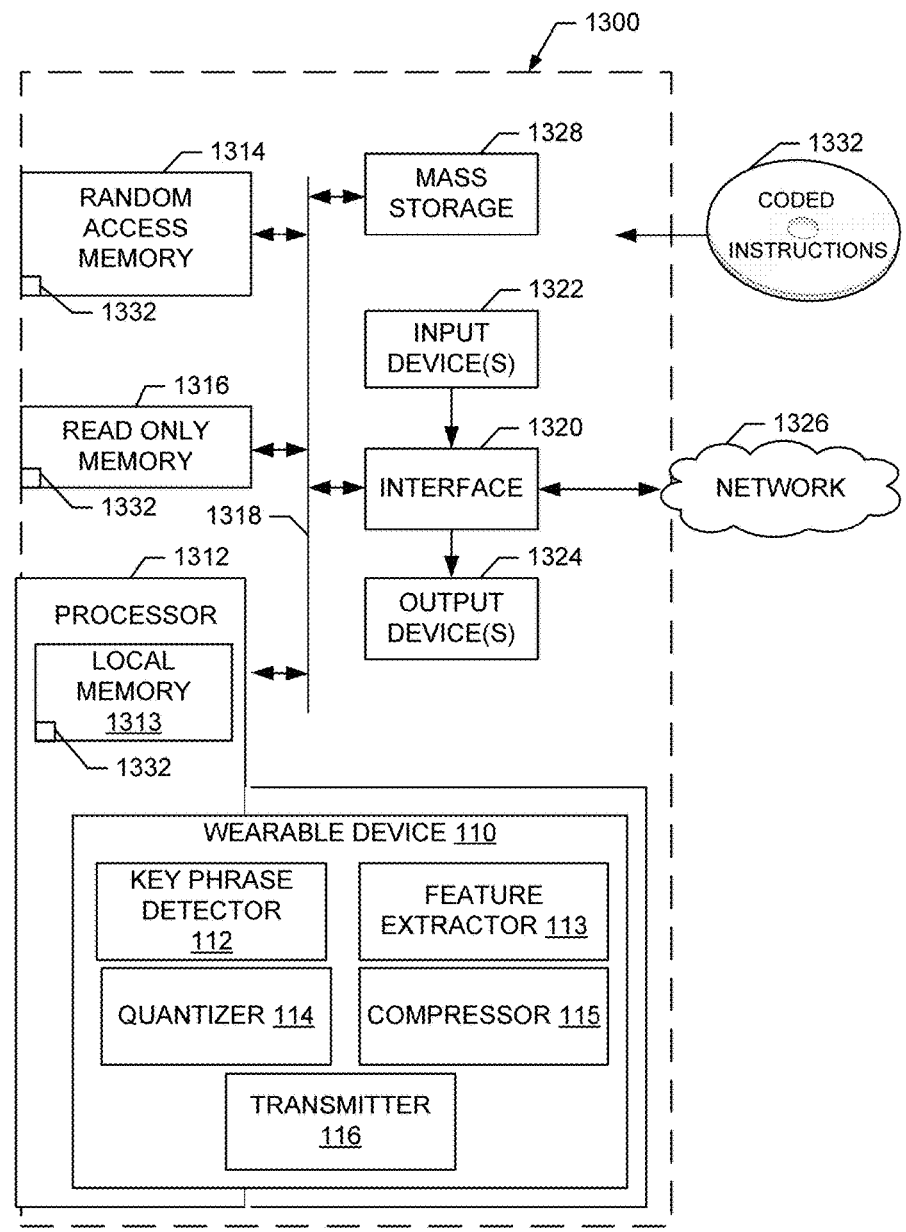
FIGS. 13-14 are schematic illustrations of example processor platforms that may execute the instructions of FIGS. 9-12 to implement the example systems of FIGS. 1-8.

FIG. 13 is a block diagram of an example processor platform 1300 capable of executing the instructions of FIGS. 9-12 to implement the wearable device 110 and associated system(s) of FIGS. 1-8. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example, the processor 1312 is structured to include the example wearable device 110 including the example key phrase detector 112, feature extractor 113, quantizer 114, compressor 115, transmitter 116, etc.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a peripheral component interconnect (PCI) express interface.

In the illustrated example, one or more input devices 1322 are connected to the interface circuit 1320. The input device(s) 1322 permit(s) a user to enter data and commands into the processor 1312. The input device(s) 1322 can be implemented by, for example, an audio sensor, a microphone, a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 9-12 may be stored in the mass storage device 1328, in the volatile memory 1314, in the non-volatile memory 1316, and/or on a removable tangible computer readable storage medium such as a CD or DVD.

Figure 14:
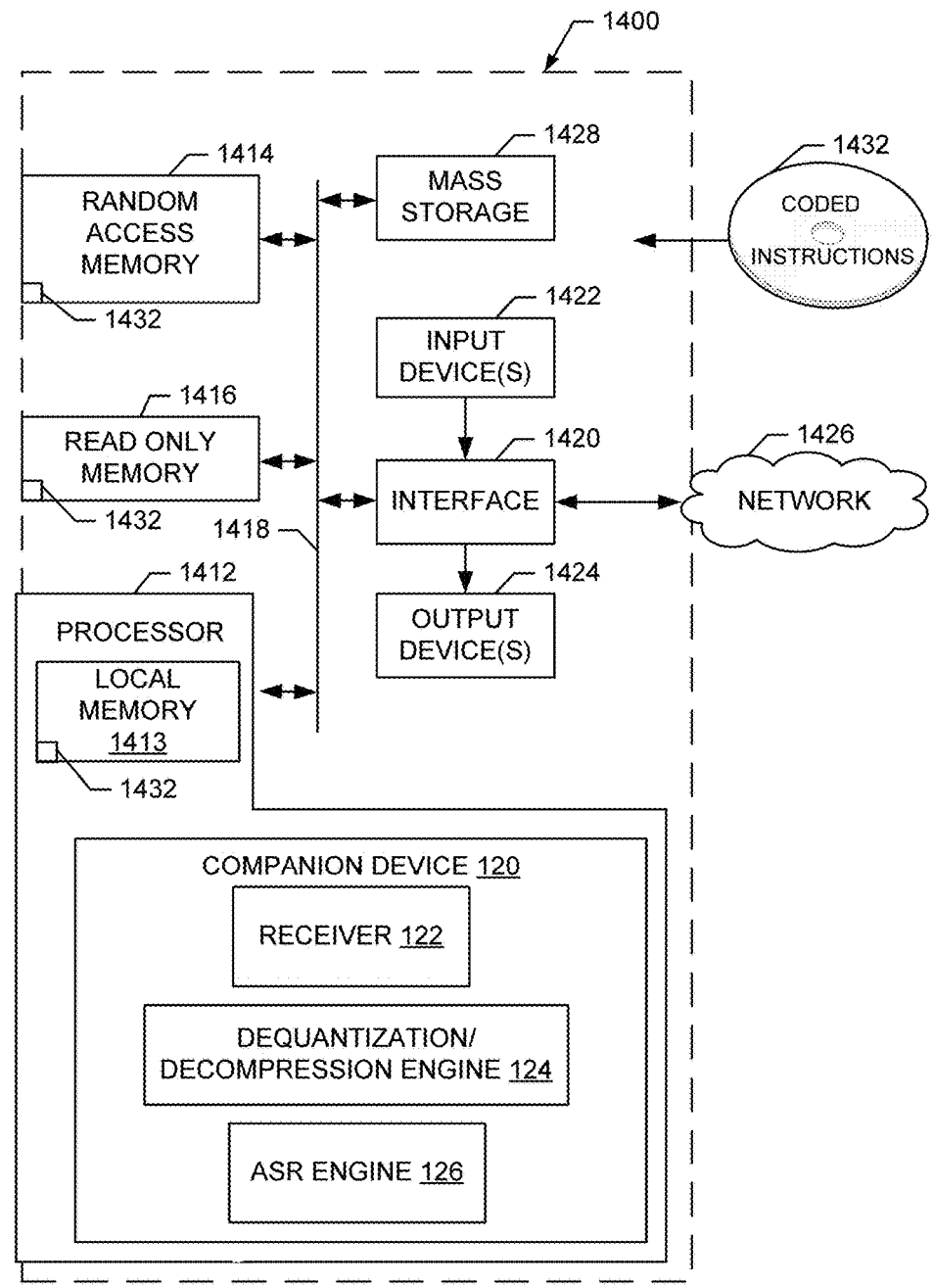

FIG. 14 is a block diagram of an example processor platform 1400 capable of executing the instructions of FIGS. 9-12 to implement the companion device 120 and associated system(s) of FIGS. 1-8. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example, the processor 1412 is structured to include the example companion device 120 including the example receiver 122, dequantization/decompression engine 124, ASR engine 126, etc.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM), 3D XPoint (such as Intel Optane™, Micron QuantX™, etc.) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a peripheral component interconnect (PCI) express interface.

In the illustrated example, one or more input devices 1422 are connected to the interface circuit 1420. The input device(s) 1422 permit(s) a user to enter data and commands into the processor 1412. The input device(s) 1422 can be implemented by, for example, an audio sensor, a microphone, a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 9-12 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed methods, apparatus and articles of manufacture facilitate monitoring, processing, transmission, and analysis of sound via a system distributed between a wearable device and a companion device via a wireless communication connection. Certain examples reduce power using BLE and/or low energy wireless communication between a lean, low power wearable device and a companion device that can handle processing for the wearable device. Certain examples, reduce and package audio data according to enable transmission over a low power connection while maintaining data quality to enable accuracy speech recognition and processing.

Example 1 is an apparatus including a detector to process an input audio signal and identify a portion of the input audio signal including a sound to be evaluated, the sound to be evaluated organized into a plurality of audio features representing the sound. The apparatus of example 1 also includes a quantizer to process the audio features using a quantization process to reduce the audio features to generate a reduced set of audio features for transmission. The apparatus of example 1 includes a transmitter to transmit the reduced set of audio features over a low-energy communication channel for processing.

Example 2 includes the subject matter of example 1, wherein the low-energy communication channel includes a Bluetooth Low Energy communication channel.

Example 3 includes the subject matter of example 1, wherein the sound to be evaluated includes speech.

Example 4 includes the subject matter of example 1, wherein the audio features include mel frequency cepstral coefficients (MFCCs).

Example 5 includes the subject matter of example 1, wherein the quantization process includes a reduction in a number of audio features.

Example 6 includes the subject matter of example 5, wherein the reduction in the number of audio features includes reduction from 23 audio features to 13 audio features to be transmitted.

Example 7 includes the subject matter of example 1, wherein the quantization process includes a reduction in bit size for each of the audio features.

Example 8 includes the subject matter of example 7, wherein the reduction in bit size is obtained by applying an A-law algorithm to encode bits of each audio feature according to a compression parameter.

Example 9 includes the subject matter of example 7, wherein the reduction in bit size is obtained by discarding one or more bits of each audio feature.

Example 10 includes the subject matter of example 9, wherein discarding one or more bits of each audio feature includes discarding 7 least significant bits and one most significant bit of each audio feature.

Example 11 includes the subject matter of example 1, wherein the apparatus includes a wearable device.

Example 12 includes the subject matter of example 1, further including a feature extractor to extract the audio features from the sound identified by the key phrase detector.

Example 13 includes the subject matter of example 1, further including a compressor to compress the reduced set of audio features for transmission by the transmitter.

Example 14 includes the subject matter of example 1, further including a microphone to detect the input audio signal.

Example 15 includes the subject matter of example 1, further including a voice-activated detector to activate the key phrase detector, quantizer, and transmitter when the input audio signal is detected.

Example 16 includes the subject matter of example 1, further including a companion device to process the reduced set of audio features received from the transmitter.

Example 17 includes the subject matter of example 16, wherein the companion device includes a dequantization engine and an automated speech recognition engine to process the reduced set of audio features to extract and evaluate the sound associated with the reduced set of audio features.

Example 18 includes the subject matter of example 16, wherein the companion device includes at least one of a cellular phone or a gateway device.

Example 19 is a method including processing an input audio signal to identify a portion of the input audio signal including a sound to be evaluated; organizing the sound to be evaluated into a plurality of audio features representing the sound; processing the audio features using a quantization process to reduce the audio features to generate a reduced set of audio features for transmission; and transmitting the reduced set of audio features over a low-energy communication channel for processing.

Example 20 includes the subject matter of example 19, wherein the low-energy communication channel includes a Bluetooth Low Energy communication channel.

Example 21 includes the subject matter of example 19, wherein the audio features include mel frequency cepstral coefficients (MFCCs).

Example 22 includes the subject matter of example 19, wherein the sound to be evaluated includes speech.

Example 23 includes the subject matter of example 19, wherein the quantization process includes a reduction in a number of audio features.

Example 24 includes the subject matter of example 23, wherein the reduction in the number of audio features includes reduction from 23 audio features to 13 audio features to be transmitted.

Example 25 includes the subject matter of example 19, wherein the quantization process includes a reduction in bit size for each of the audio features.

Example 26 includes the subject matter of example 25, wherein the reduction in bit size is obtained by applying an A-law algorithm to encode bits of each audio feature according to a compression parameter.

Example 27 includes the subject matter of example 25, wherein the reduction in bit size is obtained by discarding one or more bits of each audio feature.

Example 28 includes the subject matter of example 27, wherein discarding one or more bits of each audio feature includes discarding 7 least significant bits and one most significant bit of each audio feature.

Example 29 includes the subject matter of example 19, further including extracting the audio features from the sound to be evaluated.

Example 30 includes the subject matter of example 19, further including compressing the reduced set of audio features for transmission.

Example 31 includes the subject matter of example 19, further including activating a processor to process the input audio signal when the input audio signal is detected.

Example 32 includes the subject matter of example 19, further including processing the reduced set of audio features using a companion device to extract and evaluate the sound associated with the reduced set of audio features.

Example 33 is a tangible computer readable storage medium including computer readable instructions which, when executed, cause a processor to at least implement a method. The example method includes processing an input audio signal to identify a portion of the input audio signal including a sound to be evaluated; organizing the sound to be evaluated into a plurality of audio features representing the sound; processing the audio features using a quantization process to reduce the audio features to generate a reduced set of audio features for transmission; and transmitting the reduced set of audio features over a low-energy communication channel for processing.

Example 34 includes the subject matter of example 33, wherein the low-energy communication channel includes a Bluetooth Low Energy communication channel.

Example 35 includes the subject matter of example 33, wherein the audio features include mel frequency cepstral coefficients (MFCCs).

Example 36 includes the subject matter of example 33, wherein the sound to be evaluated includes speech.

Example 37 includes the subject matter of example 33, wherein the quantization process includes a reduction in a number of audio features.

Example 38 includes the subject matter of example 37, wherein the reduction in the number of audio features includes reduction from 23 audio features to 13 audio features to be transmitted.

Example 39 includes the subject matter of example 33, wherein the quantization process includes a reduction in bit size for each of the audio features.

Example 40 includes the subject matter of example 39, wherein the reduction in bit size is obtained by applying an A-law algorithm to encode bits of each audio feature according to a compression parameter.

Example 41 includes the subject matter of example 39, wherein the reduction in bit size is obtained by discarding one or more bits of each audio feature.

Example 42 includes the subject matter of example 41, wherein discarding one or more bits of each audio feature includes discarding 7 least significant bits and one most significant bit of each audio feature.

Example 43 includes the subject matter of example 33, wherein the method further includes extracting the audio features from the sound to be evaluated.

Example 44 includes the subject matter of example 33, wherein the method further includes compressing the reduced set of audio features for transmission.

Example 45 includes the subject matter of example 33, wherein the method further includes activating the processor to process the input audio signal when the input audio signal is detected.

Example 46 includes the subject matter of example 33, wherein the method further includes processing the reduced set of audio features using a companion device to extract and evaluate the sound associated with the reduced set of audio features.

Example 47 is an apparatus including a receiver to receive, from a wearable device, data packets including information regarding a reduced set of audio features representing a sound. The example apparatus includes a dequantization engine to process the data packets to retrieve the reduced set of audio features. The example apparatus includes an automated speech recognition engine to evaluate the reduced set of audio features to identify the sound.

Example 48 includes the subject matter of example 47, wherein the audio features include mel frequency cepstral coefficients (MFCCs).

Example 49 includes the subject matter of example 47, wherein the sound includes speech.

Example 50 includes the subject matter of example 47, wherein the dequantization engine includes a decompressor to decompress the data packets to retrieve the reduced set of audio features.

Example 51 includes the subject matter of example 47, wherein at least one of the dequantization engine or the automated speech recognition engine is to provide feedback to the wearable device.

Example 52 includes the subject matter of example 51, wherein the feedback includes at least one of text feedback or audio feedback.

Example 53 includes the subject matter of example 51, wherein the dequantization engine is to recreate at least one of a corrupted audio feature packet or a missing audio packet using interpolation from adjacent received packet information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a voice-activated detector;
a key phrase detector;
a quantizer; and
a transmitter,
the voice-activated detector to activate the key phrase detector when an input audio signal is detected,
the key phrase detector to, when activated, identify a portion of the input audio signal including a sound to be evaluated, the sound to be evaluated organized into a plurality of audio features representing the sound, the key phrase detector to activate the quantizer and the transmitter when the sound to be evaluated is identified in the input audio signal,
the quantizer to, when activated, reduce the audio features to generate a reduced set of audio features; and
the transmitter to, when activated, transmit the reduced set of audio features over a low-energy communication channel.

2. The apparatus of claim 1, wherein the low-energy communication channel includes a Bluetooth Low Energy communication channel.

3. The apparatus of claim 1, wherein the audio features include mel frequency cepstral coefficients (MFCCs).

4. The apparatus of claim 1, wherein the quantizer is to reduce the audio features by reducing a number of the audio features.

5. The apparatus of claim 4, wherein the quantizer is to reduce the number of the audio features from 23 audio features to 13 audio features.

6. The apparatus of claim 1, wherein the quantizer is to reduce the audio features by reducing a bit size for each of the audio features.

7. The apparatus of claim 6, wherein the quantizer is to reduce the bit size by applying an A-law algorithm to encode bits of each audio feature according to a compression parameter.

8. The apparatus of claim 6, wherein the quantizer is to reduce the bit size by discarding one or more bits of each audio feature.

9. The apparatus of claim 8, wherein the quantizer is to discard 7 least significant bits and one most significant bit of each audio feature.

10. The apparatus of claim 1, wherein the apparatus includes a wearable device.

11. The apparatus of claim 1, further including a feature extractor to extract the audio features from the sound identified by the key phrase detector.

12. The apparatus of claim 1, further including a companion device to process the reduced set of audio features received from the transmitter.

13. The apparatus of claim 12, wherein the companion device includes a dequantization engine and an automated speech recognition engine to process the reduced set of audio features to extract and evaluate the sound associated with the reduced set of audio features.

14. The apparatus of claim 12, wherein the companion device includes at least one of a cellular phone or a gateway device.

15. The apparatus of claim 1, wherein the sound to be evaluated is to include speech.

16. The apparatus of claim 1, further including a feature extractor to extract the audio features from the portion identified by the key phrase detector.

17. The apparatus of claim 1, further including a compressor to compress the reduced set of audio features for transmission by the transmitter.

18. The apparatus of claim 1, further including a microphone to detect the input audio signal.

19. A method comprising:
activating a first process to be executed by a voice-activated detector when an input audio signal is detected;
identifying, by executing an instruction of the first process with the voice-activated detector, a portion of the input audio signal including a sound to be evaluated;
activating a second process to be executed by a key phrase detector when the sound to be evaluated is identified;
activating, by executing an instruction of the second process with the key phrase detector, a quantizer and a transmitter when the sound to be evaluated is identified in the input audio signal;
organizing, by executing an instruction of the second process with the key phrase detector, the sound to be evaluated into a plurality of audio features representing the sound;
reducing, by executing an instruction of a third process with the quantizer, the audio features to generate a reduced set of audio features; and
transmitting, using the transmitter, the reduced set of audio features over a low-energy communication channel.

20. The method of claim 19, wherein the low-energy communication channel includes a Bluetooth Low Energy communication channel.

21. The method of claim 19, wherein the audio features include mel frequency cepstral coefficients (MFCCs).

22. The method of claim 19, wherein the reducing of the audio features includes reducing a number of audio features.

23. The method of claim 22, wherein the reducing of the number of audio features includes reducing 23 audio features to 13 audio features.

24. The method of claim 19, wherein the reducing of the audio features includes reducing a bit size for each of the audio features.

25. The method of claim 24, wherein the reducing of the bit size includes applying an A-law algorithm to encode bits of each audio feature according to a compression parameter.

26. The method of claim 24, wherein the reducing of the bit size includes discarding one or more bits of each audio feature.

27. The method of claim 19, further including processing the reduced set of audio features using a companion device to extract and evaluate the sound associated with the reduced set of audio features.

28. A tangible computer readable storage medium comprising computer readable instructions which, when executed, cause a voice-activated detector implemented by a processor to at least:
in response to detection of an input audio signal:
activate a key phrase detector to:
identify a portion of the input audio signal including a sound to be evaluated; and
in response to identification of the sound to be evaluated:
activate a quantizer and a transmitter;
organize the sound to be evaluated into a plurality of audio features representing the sound;
instruct the quantizer to reduce the audio features based on a quantization process to generate a reduced set of audio features; and
instruct the transmitter to transmit the reduced set of audio features over a low-energy communication channel.

29. A wearable apparatus comprising:
a voice-activated detector to activate a key phrase detector, a quantizer, and a transmitter when an input audio signal is detected;
the key phrase detector which, when activated, is to identify a portion of the input audio signal including a sound to be evaluated, the sound to be evaluated organized into a plurality of audio features representing the sound;
the quantizer which, when activated, is to reduce the audio features to generate a reduced set of audio features; and
the transmitter which, when activated, is to transmit the reduced set of audio features over a low-energy communication channel to a companion device for dequantization of the reduced set of audio features to extract speech information from the reduced set of audio features.

* * * * *